(12) United States Patent
Hiemstra et al.

(10) Patent No.: US 10,823,390 B1
(45) Date of Patent: Nov. 3, 2020

(54) ILLUMINATING ASSEMBLY FOR USE WITH SHELVING

(71) Applicant: Innotec, Corp., Zeeland, MI (US)

(72) Inventors: Nathan S. Hiemstra, Hudsonville, MI (US); Raymond J. Reeths, Grand Haven, MI (US); Jason R. Mulder, Zeeland, MI (US); Jonathan R. DeYoung, Grand Rapids, MI (US); Thomas J. Veenstra, Lakewood, CO (US)

(73) Assignee: INNOTEC, CORP., Zeeland, MI (US)

( * ) Notice: Subject to any disclaimer, the term of this patent is extended or adjusted under 35 U.S.C. 154(b) by 0 days.

(21) Appl. No.: 16/947,529

(22) Filed: Aug. 5, 2020

Related U.S. Application Data

(62) Division of application No. 15/750,250, filed as application No. PCT/US2016/046347 on Aug. 10, 2016.

(60) Provisional application No. 62/203,722, filed on Aug. 11, 2015.

(51) Int. Cl.
| | |
|---|---|
| *F21V 33/00* | (2006.01) |
| *F25D 27/00* | (2006.01) |
| *F25D 25/02* | (2006.01) |
| *F21V 8/00* | (2006.01) |
| *F21Y 103/37* | (2016.01) |
| *F21W 131/301* | (2006.01) |
| *F21W 131/405* | (2006.01) |

(Continued)

(52) U.S. Cl.
CPC .......... *F21V 33/0012* (2013.01); *F25D 25/02* (2013.01); *F25D 27/00* (2013.01); *G02B 6/0001* (2013.01); *G02B 6/001* (2013.01); *G02B 6/0095* (2013.01); *F21W 2131/301* (2013.01); *F21W 2131/405* (2013.01); *F21Y 2103/37* (2016.08); *F21Y 2113/10* (2016.08); *F21Y 2115/10* (2016.08)

(58) Field of Classification Search
CPC ..... G02B 6/0095; F25D 27/00; F25D 27/005; F21V 33/0044; F21V 33/0048; F21W 2131/301; F21W 2131/305
See application file for complete search history.

(56) References Cited

U.S. PATENT DOCUMENTS

| | | |
|---|---|---|
| 2006/0108902 A1 | 5/2006 | Lowery et al. |
| 2008/0278932 A1 | 11/2008 | Tress |
| 2010/0238678 A1 | 9/2010 | Lin |

(Continued)

OTHER PUBLICATIONS

International Search Report and Written Opinion from PCT/US2016/046347 dated Oct. 26, 2016.

*Primary Examiner* — Sean P Gramling
(74) *Attorney, Agent, or Firm* — Warner Norcross + Judd LLP

(57) ABSTRACT

An illumination assembly including a light pipe and a light supply for use in illuminating shelf dividers on a shelf. The light pipe includes a first end portion including a light inlet, a second end portion including a light outlet, and a body portion extending between the first and second end portions. The light supply directs light into the light inlet, whereby at least a portion of the light subsequently exits the light pipe through the light outlet. When the first end portion is positioned adjacent a rear edge of the shelf, the body portion extends from the rear edge to a front edge of the shelf. The light pipe is configured to transmit at least a portion of the light emitted by the light supply from the light inlet to the light outlet to illuminate an area adjacent the shelf front edge.

5 Claims, 12 Drawing Sheets

(51) Int. Cl.
 *F21Y 115/10* (2016.01)
 *F21Y 113/10* (2016.01)

(56) References Cited

U.S. PATENT DOCUMENTS

2014/0268862 A1 9/2014 Gooden
2014/0320040 A1 10/2014 Katu et al.

ILLUMINATING ASSEMBLY FOR USE WITH SHELVING

BACKGROUND OF THE INVENTION

The present invention relates to illumination assemblies, and more particularly to illumination assemblies for distributing light along shelving used to store and display items.

Lights are often mounted to shelving to illuminate items on display on the shelving. In a retail setting, it is often advantageous for stores to illuminate products stored on display surfaces to improve the appearance and appeal of the products and to promote product sales. However, providing illumination for shelving with movable components, such as shelf dividers and sliding trays, can be challenging. Typical lighting assemblies, which use multiple light sources connected by wiring, can be difficult to set up and customize based on the particular storage and display needs.

SUMMARY

The aforementioned problems are overcome in the present invention in which an illumination assembly includes at least one light pipe configured to distribute light across a depth dimension of a shelf from a rear edge of the shelf to the front edge of the shelf.

According to one embodiment, an illumination assembly for use with a shelf having a depth dimension defined between a front edge and a rear edge of the shelf and a length dimension includes a first light pipe having a first end portion including a first light inlet, a second end portion including a first light outlet, and a first body portion extending between the first and second end portions and a light supply coupled with the first light pipe to supply light thereto. The light supply includes a third end portion, a fourth end portion, and a second body portion extending between the third and fourth end portions. The light supply is adapted to direct light into the first light inlet along a length of the second body portion. When the light supply is positioned adjacent a rear edge of the shelf with the second body portion extending along at least a portion of the shelf rear edge, the first light pipe is adapted to couple with the light supply at the first end portion, with the first body portion extending across the shelf depth dimension and the second end portion positioned adjacent the front edge of the shelf, whereby light is transmitted through the light inlet in the first end portion to the first light outlet in the second end portion adjacent the shelf front edge to illuminate an area adjacent the shelf front edge.

According to another embodiment, the light supply includes a second light pipe forming the third end portion, fourth end portion, and second body portion. At least one of the third or the fourth end portions includes a second light inlet and a second light outlet is formed in the second body portion and adapted to direct light into the first light inlet. At least one light engine is disposed adjacent the second light inlet and adapted to direct light into the second light inlet, whereby light is transmitted through the second body portion to the first light inlet of the first light pipe and subsequently exits the first light pipe through the first light outlet.

According to another embodiment, the light supply includes at least one light engine comprising a plurality of light sources arranged in a row along the length of the second body portion and adapted to direct light into the first light inlet.

According to another embodiment, an illumination assembly for use with a shelving unit having a depth dimension defined between a front edge and a rear edge of the shelving unit, the shelving unit including a tray that is moveable in the depth dimension between a retracted position and an extended position, includes a light pipe including a first end portion including a light inlet, a second end portion opposite the first end portion, a body extending between the first and second end portions, and at least one light outlet in one of the second end portion and the body. A light engine is adapted to selectively couple with the first end portion to direct light into the light inlet, whereby at least a portion of the light subsequently exits the light pipe through the at least one light outlet. The light pipe is adapted to connect with the tray and the light engine is adapted to connect with a stationary portion of the shelving unit such that (a) when the tray is in the retracted position, the first end portion of the light pipe is coupled with the light engine to receive light through the light inlet, and (b) when the tray is in the extended position, the light pipe is uncoupled from the light engine.

These and other advantages and features of the invention will be more fully understood and appreciated by reference to the description of the current embodiments and the drawings.

DESCRIPTION

I. Structure

Figure 1:
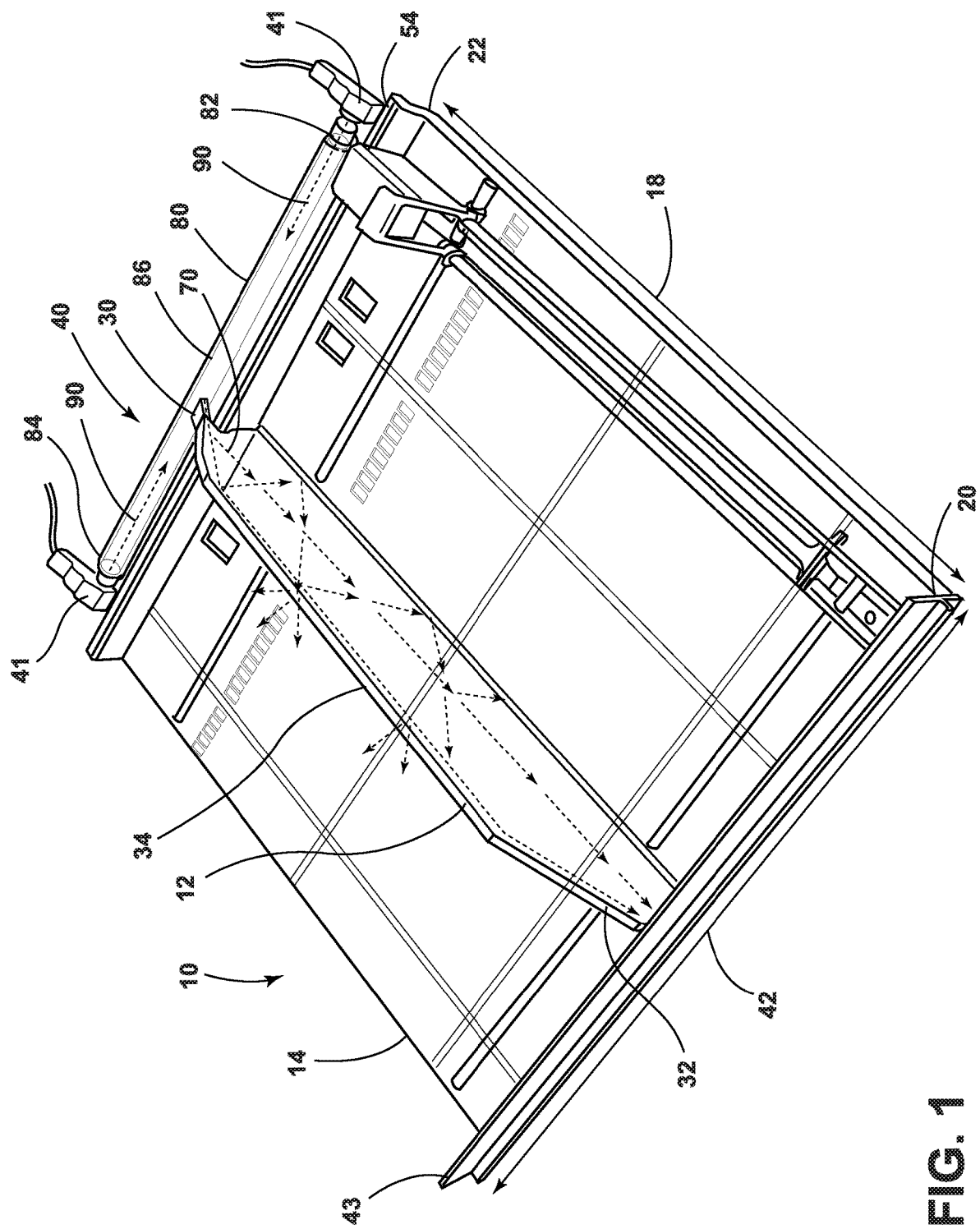
FIG. 1 is a perspective view of an illumination assembly according to a first embodiment of the invention.

With reference to FIG. 1, an illumination assembly 10 is illustrated in accordance with a first embodiment of the invention. The illumination assembly 10 can include one or more light guides or pipes 12 which are mounted on shelf 14 for providing illumination to items stored on the shelf 14. While only one light pipe 12 is illustrated, multiple light pipes 12 can be used with the shelf 14 to divide the space on the shelf 14 into multiple sections. The light pipes 12 can be configured to extend across a shelf depth dimension 18 defined between a front edge 20 and a rear edge 22 of the shelf 14. Each light pipe 12 can include a first end portion 30, a second end portion 32, and a body portion 34 extending between the first and second end portions 30. The illumination assembly 10 can also include a light supply 40 configured to couple with the first end portion 30 to provide illumination emitted from one or more light engines 41 to the one or more light pipes 12 coupled with the light supply 40.

The light pipe 12 can include a notched first end portion 30 that rests upon and is supported by a support track 54 that runs generally along the shelf length dimension 42. The first end portion 30a can include a light inlet with at least a portion of the second end portion 32a and/or the body portion 34a including at least one light outlet. The light supply 40 can be coupled with the light pipe 12 and configured to direct light into the light inlet in the first end portion 30 to provide illumination to the light pipe 12. At least a portion of the light provided to the light pipe 12 can exit through the light outlet in the second end portion 32 and/or body portion 34 to illuminate areas adjacent the light outlet(s) and the items stored thereon. The light pipe 12 can be configured such that when the first end portion 30 is positioned adjacent the rear edge 22 of the shelf 14, the body portion 34 extends across at least a portion of the shelf depth dimension 18 such that the second end portion 32 is positioned adjacent the front edge 20 of the shelf 14. In this manner, the light pipe 12 can provide illumination from the light supply 40, which is positioned at the rear edge 22 of the shelf 14, to the front edge 20 of the shelf 14 and optionally along the depth dimension 18 of the shelf 14.

The inlet in the first portion 30 and the one or more light outlets in the second end portion 32 and/or body portion 34 can include one or more optical aberrations to facilitate distributing the light through the light pipe 12 and emitting the light through the one or more light outlets. Non-limiting examples of optical aberrations include dots, lines, hatched circles, hatched boxes, lattice structures, other geometric shapes, such as chevrons, and combinations thereof. The shape, pattern, density, location, and depth of the optical aberrations can be selected to extract the desired portion of light emitted from the light supply 40 for emission through the second end portion 32 and/or the body portion 34. The optical aberrations can be formed using any suitable process, non-limiting examples of which include laser etching, machine etching, chemical etching, or in the mold used in forming the light pipe 12, to provide the desired surface geometry for reflecting and/or refracting light to extract light from the light pipe 12 through the light outlets provided in the second end portion 32 and/or the body portion 34. In addition to optical aberrations, the cross-sectional shape of the light pipe 12 can be configured to mix and distribute the light provided by the light supply 40 prior to the light exiting the light pipe 12 through the light outlets, as described in co-pending application PCT/US2016/036964, filed Jun. 10, 2016, entitled "Illumination Assembly for Distributing Light," the contents of which are herein incorporated by reference in their entirety. Optionally, the surface of the light outlets in the second end portion 32 and/or the body portion 34 can have a smooth or textured surface finish to facilitate distributing the light emitted from the light pipe 12. For example, the second end portion 32 can include an etched or molded rib pattern to extract light at the shelf front edge.

Each of the light pipes 12 can extend generally across a majority of the depth dimension 18 of the shelf 14 and thus act as shelf dividers to divide or separate the shelf 14 into multiple areas along a length dimension 42 of the shelf 14. In one example, a length dimension 44 of light pipe 12 can correspond to 50-100% of the shelf depth dimension 18, preferably 75-100% of the shelf depth dimension 18, and more preferably 90-100% of the shelf depth dimension 18. In another example, the light pipe 12 can have a length dimension 44 such that the first end portion 30 can be positioned within an area within 0-25% of an exterior face defining an exterior limit of the shelf rear edge 22 and the second end portion 32 can be positioned within an area within 0-25% of an exterior face defining an exterior limit of the shelf front edge 20, with 0% corresponding to the exterior face of the shelf 14 defining the end of the front and rear edges 20, 22.

The shelf 14 can also be provided with a face plate 43 at the shelf front edge 20. The face plate 43 can act as a blocking plate to prevent the items from falling off the shelf 14, a sign including one or more graphics, and/or provide illumination to the area adjacent the shelf front edge 20. For example, the face plate 43 can be in the form of a light pipe which receives light from one or more of the light pipes 12 to provide area lighting adjacent the shelf front edge 20 or to backlight a graphic, as discussed in co-pending application PCT/US2015/58792, filed on Nov. 3, 2015, entitled "Illumination Assembly Providing Backlight and Downlight," the contents of which are incorporated by reference herein in their entirety. When the face plate 43 includes graphics or supports a sign having graphics thereon, the light from the light pipes 12 can backlight the graphics.

As illustrated in FIG. 1, the illumination assembly 10 is coupled with a shelf 14 that can be supported on a display surface, which may be part of a larger shelving unit. In another example, the display surface can form the shelf for supporting the items directly without the use of a separate shelf component 14. In this example, the illumination assembly 10 can be coupled directly with the display surface. In addition, while the illumination assembly 10 is described in the context of being mounted to a horizontal shelf 14, it will be understood that the illumination assembly 10 can similarly be mounted to a vertical surface or a surface disposed at an angle relative to the horizontal.

This specification consistently uses the term "light pipe" to refer to the portion 12. The term "light guide" could be used interchangeably with "light pipe". Light pipe in this specification is intended to include any device designed to transport light from a light source to a location at some distance from the light source with minimal, or at least modest, loss. Light is transmitted through a light pipe by means of internal reflection.

Still referring to FIG. 1, the light supply 40 can be in the form of a second, light supply light pipe 80 that includes first and second end portions 82, 84 connected by a body portion 386 and is configured to extend along at least a portion of the shelf length dimension 42 adjacent the shelf rear edge 22. The first and/or second end portions 82, 84 can include a light inlet adapted to receive light from the light engines 41. A light engine 41 can be provided adjacent each of the first and second end portions 82, 84, as illustrated, to direct light into the light inlets formed therein. Optionally, only a single light engine 41 can be provided at one of the first or second end portions 82, 84. As illustrated by arrows 90, light from the light engines 41 is directed into the light inlets in the first and second end portions 82, 84 and distributed along the body portion 86.

The first end portion 30 of the light pipe 12 can be configured to receive light traveling through the body portion 86 of the light supply light pipe 80 for distribution to the second end portion 32 of the light pipe 12 at the shelf front edge 20. One or both of the first end portion 30 of the light pipe 12 and/or the body portion 86 of the light supply light pipe 80 can be configured to extract light from the body portion 86 for distribution through the light pipe 12. The body portion 86 can include one or more light outlets through which at least a portion of the light traveling through the body portion 86 can exit or be extracted from the light supply light pipe 80. In one example, the body portion 86 can include a light outlet that extends continuously along at least a portion of the length of the body portion 86. In another example, the body portion 86 can include multiple, discrete light outlets spaced apart along at least a portion of the length of the body portion 86.

Figure 2A:
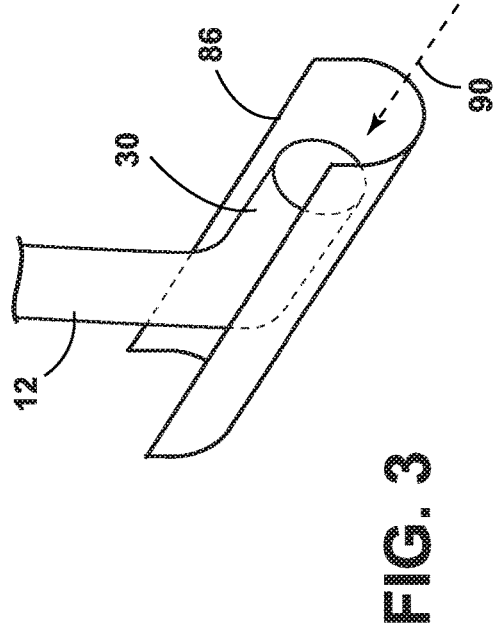
FIGS. 2A-B are schematic views of a light pipe and light supply according to a second embodiment of the invention.
Figure 2B:
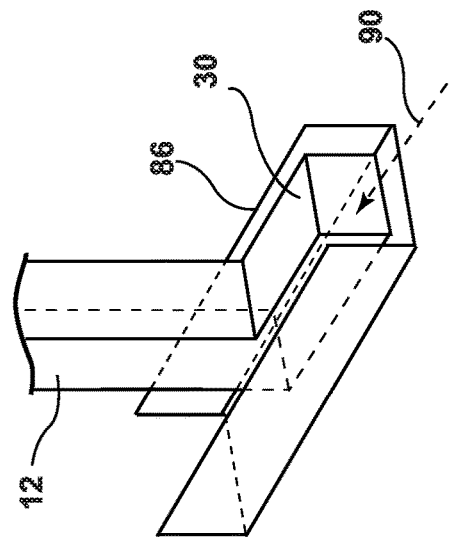

FIGS. 2A-B and 3-4 illustrate several examples for configuring the light supply light pipe 80 and the light pipe 12 for directing light from the light supply light pipe 80 to the light inlet in the light pipe 12. In the example of FIG. 2A, the first end portion 30 of the light pipe 12 can be configured to abut the body portion 86 of the light supply light pipe 80. One or both of the abutting surfaces of the first end portion 30 and/or the body portion 86 can include optical aberrations 94, illustrated in FIG. 2B, to extract the light traveling through the body portion 86 and direct the light into the light inlet in the first end portion 30. Optionally, the first end portion 30 of the light pipe 12 can have a cross-sectional shape to facilitate gathering and extracting light from the body portion 86 and directing the light through the light pipe 12. FIG. 2A illustrates one example cross-sectional shape in which the first end portion 30 includes a "fan shaped" portion in which the end including the light inlet is wider than the adjacent neck portion of the light pipe 12. FIG. 2A also illustrates an optional frame 96 that at least partially encompasses the light supply light pipe 80 to protect the light pipe 80 and/or to block/reflect stray light.

Figure 3:
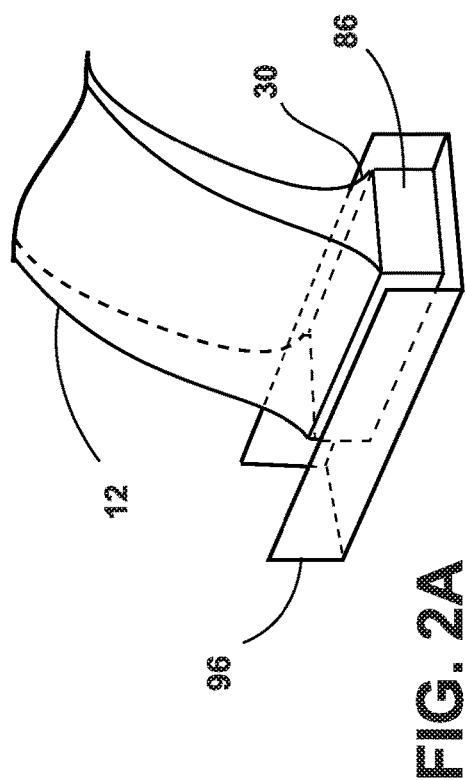
FIG. 3 is a schematic view of a light pipe and light supply according to a third embodiment of the invention.
Figure 4:
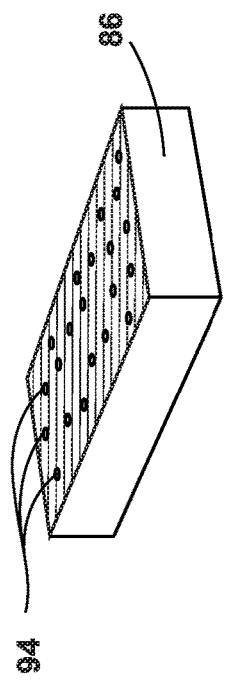
FIG. 4 is a schematic view of a light pipe and light supply according to a fourth embodiment of the invention.

FIGS. 3 and 4 illustrate another example for directing light from the light supply light pipe 80 into the light pipe 12. The light supply light pipe 80 can include an open channel, such as the C-shaped channel of FIG. 3 or the U-shaped channel of FIG. 4, which is sized so as to receive the first end portion 30 within the channel. The first end portion 30 can include a bent or curved portion that fits within the channel and aligns the light inlet with the direction in which the light 90 is traveling through the body portion 86. The channel-shaped light pipe 12 of FIGS. 3 and 4 can include a continuous opening extending along at least a portion of the body portion 86 through which the first end portion 30 can be inserted. In another example, the channel-shaped light pipe includes discrete openings spaced along at least a portion of the body portion 86 through which the first end portion 30 can be inserted.

The color of the light provided to the light pipe 12 can be changed by using a colored light source with the light engine 41 or using one or more color filters provided adjacent the light inlets in the light supply light pipe 80, the light outlets in the light supply light pipe 80, and/or the light inlet in the first end portion 30 of the light pipe 12. In another example, rather than a color filter, a photoreactive material could be used to provide the light pipe 12 with the desired color.

Still referring to FIG. 1, the light engine 40 can include one or more the light sources in the form of a light emitting diode (LED). Optional light sources that can be used with the illumination assembly 10 include small fluorescent lamp bulbs, electroluminescent lighting (EL), organic light emitting diodes (OLEDs), and/or other non-LED light sources. The light sources can provide colored light or "white" light. The light source can receive electrical power through a battery and/or a wired connection to electrical mains power.

While the illumination assembly 10 is described in the context of a configuration which includes the support track 54, alternative or additional fastening or mounting systems for supporting the light pipe 12 can also be used, non-limiting examples of which include grooves within the shelf 14 that receive the light pipe 12 and frame elements at the shelf front and/or rear edge 20, 22. For example, the shelf 14 can include grooves within which the light pipes 12 can fit to stabilize each light pipe 12. In another example, the shelf 14 can include a frame element near the shelf front edge 20 that includes a slot for receiving the second edge portion 32 to stabilize the light pipe 12 relative to the shelf 14. The light pipe 12 can be supported relative to the shelf 14 using any known fastening or mounting system, non-limiting examples of which include adhesives, welds, screws, pins, clamps, brackets, magnets, and a male-female interference-type connection.

The light supply 40 can be coupled with the shelf 14 or a component adjacent the shelf 14 using any known fastening or mounting system, non-limiting examples of which include adhesives, welds, screws, pins, clamps, brackets, magnets, and a male-female interference-type connection. In one example, the light supply 40 can be coupled with the shelf 14 such that the light supply 40 moves with the shelf 14. For example, if the shelf 14 is slidable in the depth dimension relative to support structure, the light supply 40 can be moveable with the shelf 14.

Figure 5:
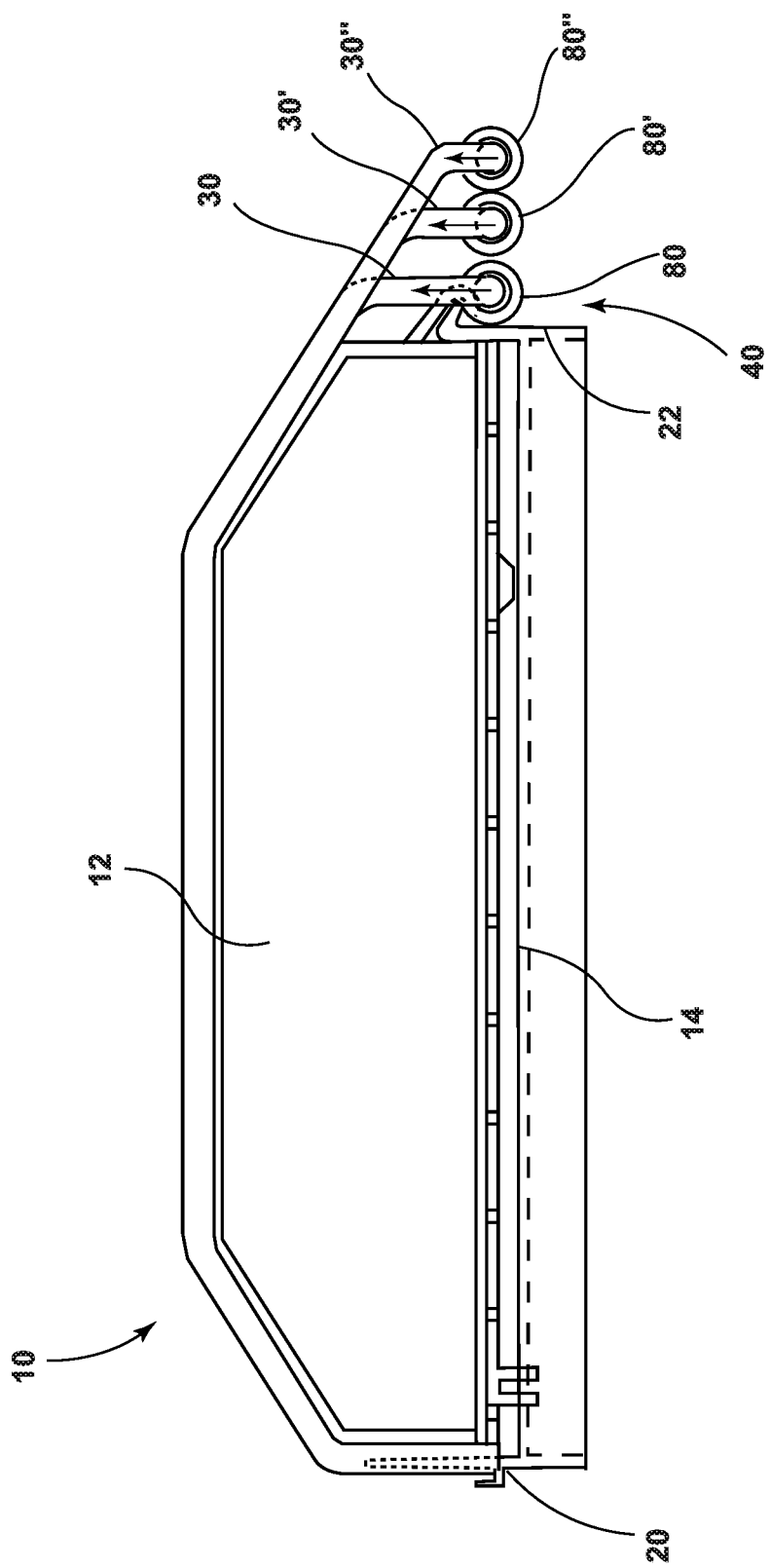
FIG. 5 is a cross-sectional schematic view of an illumination assembly according to a fifth embodiment.

Referring now to FIG. 5, in one example, multiple light supply light pipes 80, 80', and 80" can be provided in parallel, each supplying light of a different color. Various light pipes 12 each having a first end portion 30, 30', and 30" having a length configured to mate with one of the multiple light supply light pipes 80, 80', and 80", can be provided to a user to allow for customization of the shelf 14. The user can select the color of light to be displayed at a certain location on the shelf 14 by selecting the light pipe 12 with the first end portion 30, 30', and 30" having a length that extends to mate with the light supply light pipe 80, 80', and 80" emitting the desired color.

FIG. 5 illustrates another example of an illumination assembly 110 which includes features similar to those of the illumination assembly 10 of FIG. 1. Therefore, components of the illumination assembly 110 similar to those of the illumination assembly 10 are labeled with the prefix 100. The illumination assembly 110 can include a light supply 140 that is oriented so as to allow the first end portion 130 of the light pipe 12 to couple and uncouple with the light supply 140 as the shelf 114 is slid in and out. The shelf 114 and the light supply 140 can be mounted to a shelving unit (not shown) supporting the shelf 114. The shelf 114 can be moveably mounted to the shelving unit to allow the shelf 114 to be slid in and out between retracted and extended positions while the light supply 140 remains stationary with the shelving unit.

The angle at which the first end portion 130 and the light supply light pipe 180 couple can be selected so as to allow the first end portion 130 to be moved between a retracted position in which the first end portion 130 is coupled with the light supply light pipe 180 such that light is directed into the light inlet in the first end portion 130 and an extended position in which the first end portion 130 is uncoupled from the light supply light pipe 180 as the shelf 114 is slid in and out, respectively.

Multiple light supply light pipes 180 can be stacked vertically and used with multiple light pipes 112 having a first end portion 130 angled so as to couple with one of the light supply light pipes 180 in a manner similar to that disclosed above with respect to FIG. 5. For example, each of the stacked light supply light pipes 180 can be configured to provide light of a different color to a light pipe 112 configured to mate with that particular light supply light pipe 180. The angle of each of the light pipes 112 and the light supply light pipes 180 can also be configured to allow the shelf 114 and light pipes 112 to slide in and out relative to the light supply light pipes 180 as discussed above with respect to FIG. 6.

The light pipes 12 and 112 of each of the illumination assemblies 10 and 110 can be configured to extract at least a portion of the light directed into the light inlet such that light exits the light pipes 12, 112 through the one or more light outlets provided in the second end portion 32, 132 and/or the body portion 34, 134. FIG. 1 illustrates a schematic representation of the transmission and extraction of light rays 70 through the light pipe 12. The light rays 70 are provided to illustrate some of the transmission of light through the light pipe 12. These light rays are provided for illustrative purposes only for the purposes of discussion and should not be interpreted as a representation of the actual transmission of light through the light pipe 12 or all of the emitted and extracted light.

The light supply 40 is coupled with the first end portion 30 of the light pipe 12 such that light emitted from the light engines 41 is directed into the light inlet in the first end portion 30 and subsequently transmitted through the light pipe 12 by means of internal reflection. The light pipe 12 can be configured such that a portion of the light rays 70 are extracted along the body portion 34 in addition to extracting light through the light outlet in the second end portion 32. In another example, the light pipe 12 can be configured such that the majority of the light rays 70 are extracted through the second end portion 32 and not along the body portion 34. It will be understood that there may be some unintended extraction or loss of light through the body portion 34 as the light rays 70 travel toward the second end portion 32, even when the light pipe 12 is configured to promote light extraction through only the second portion 32.

As discussed above with respect the illumination assembly 10 of FIG. 1, the light pipe 12 can include one or more optical aberrations to extract the light rays 70 traveling through the light pipe 12 through the one or more outlets provided in the second end portion 32 and/or the body portion 34. The shape, pattern, density, location, and depth of the optical aberrations can be selected to extract the desired portion of the light rays 70 emitted from the light source 50 for emission through the second end portion 32 and/or the body portion 34. In addition to optical aberrations, the cross-sectional shape of the light pipe 12 can be configured to mix and distribute the light provided by the light engine 40 prior to the light exiting the light pipe 12 through the light outlets, as described in co-pending application PCT/US2016/036964, filed Jun. 10, 2016, entitled "Illumination Assembly for Distributing Light," the contents of which are herein incorporated by reference in their entirety. Optionally, the surface of the light outlets in the second end portion 32 and/or the body portion 34 can have a smooth or textured surface finish to facilitate distributing the light emitted from the light pipe 12.

II. Operation

Referring again to FIG. 1, the illumination assembly 10 can be used to provide light from a light source at a rear edge of a shelf to a front edge of the shelf to illuminate the area adjacent the front edge of the shelf. The illumination assembly 10 can also provide illumination along the depth dimension of the shelf. In the embodiment of FIG. 1, the illumination assembly 10 the light pipe 12, can distribute light directed into the light inlet in the first end portion 30 at the shelf rear edge 22 to one or more light outlets provided in the second end portion 32 at the shelf front edge 20. The light pipe 12 can also include one or more light outlets along the body portion 34 such that light can be distributed along the length of the light pipe 12, thus illuminating areas along the depth dimension 18 of the shelf 14. Multiple light pipes 12 can be configured in this manner to act as shelf dividers to divide and separate the shelf 14 into multiple areas within which items can be stored and displayed. The illuminated light pipe dividers can provide light to facilitate viewing the items stored on the shelf as well as to distinguish or call attention to the items.

When multiple light pipes 12 are used with the shelf 14, each of the light pipes 12 can be the same or different from the other light pipes 12 to provide the shelf 14 with the desired aesthetic. The light pipes 12 and their corresponding light engines 41 can be configured to provide the desired color, intensity, and/or distribution of light. In one example, for a given shelf 14 and set of light engines 41, light pipes of different size, shape, and optical configuration can be swapped or exchanged to provide the desired aesthetic. The light pipes 12 and the shelf 14 can be part of a unit or the light pipes 12, the light supply 40, and other support and power components can be provided as a kit for retrofitting to an existing shelf 14.

In addition to providing illumination to the area adjacent the shelf front edge 20 and along the depth dimension 18 of the shelf 14, the light pipes 12 can also provide backlighting for signage provided at the shelf front edge 20. As described above with respect to FIG. 1, the face plate 43 can include graphics formed thereon or can be configured to support a sign having graphics which can be backlit by light exiting the light pipes 12 at the second end portion 32.

The illumination assembly described herein can also allow for customization of the color of light emitted. The color of light emitted by each light pipe 12 can be customized by exchanging the light source for a light source outputting a desired color. In another example, as described above, color filters can be provided between the light inlets in the light inlets in the light supply light pipe 80, the light outlets in the light supply light pipe 80, and/or the light inlet in the first end portion 30 of the light pipe 12 to provide the shelf divider light pipes 12 with the desired color of light.

The illumination assemblies 10 and 110 can provide a compact and easy to use design for providing illumination at the front of a shelf divider and/or along the shelf divider from one or more light sources provided at the rear of the shelf. Providing a shared linear source of illumination that extends along the shelf rear edge provides a source of illumination that can be utilized along the length dimension of the shelf by any light pipe divider used with the shelf. The light pipe divider can be positioned and moved to a desired location on the shelf without having to disconnect and reconnect or readjust wiring associated with the light engine.

The light pipe divider of the illumination assemblies 10 and 110 can also be positioned and moved without having to move the light engine, decreasing the likelihood of damaging the light engine. The shared linear source of illumination can also minimize the number of electrical cables required to provide power to the assembly compared to a set up in which each light source associated with each illuminated divider includes its own power source connection. Fewer cables can decrease the amount of space occupied by the assembly behind the shelf and decrease the number of cables that can become entangled or damaged during use.

The light pipe shelf dividers can be configured to gather or extract approximately the same amount of light as the light pipe is moved along the shared linear source of illumination, which allows the user to select the desired position of the light pipe, and thus the divider, along the shelf length dimension. The design of the illumination assemblies 10 and 110 also facilitates interchanging the light pipes 12, 112 within and between assemblies, retrofitting existing shelf units, and customizing the aesthetic, positioning, and color of the light pipe shelf dividers.

Figure 6:
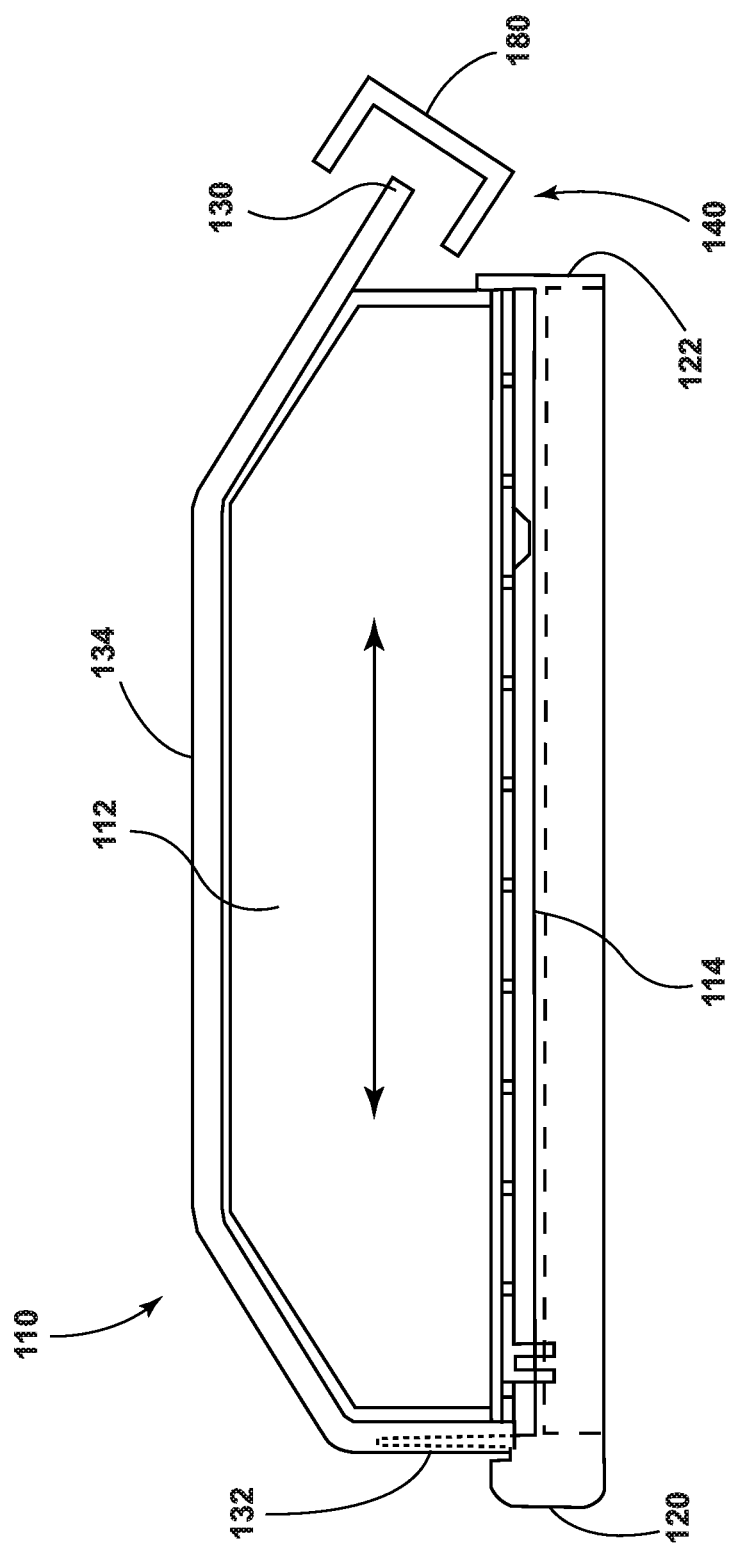
FIG. 6 is a perspective view of an illumination assembly according to a sixth embodiment of the invention.

As described with respect to the illumination assembly 110 of FIG. 6, the light pipe 112 can be moveable along the shelf length dimension and also moveable with respect to the light supply 40. The angle of the first end portion 130 and the light supply light pipe 180 can be configured so as to allow the first end portion 130 to couple and uncouple from the light supply light pipe 180 as the shelf 114 is slid in and out. Because the light supply light pipe 180 remains stationary with respect to the shelf 114, the shelf 114 can slide without moving electrical cables associated with the light engines, which decreases the likelihood of the cables becoming tangled or damaged.

Figure 7:
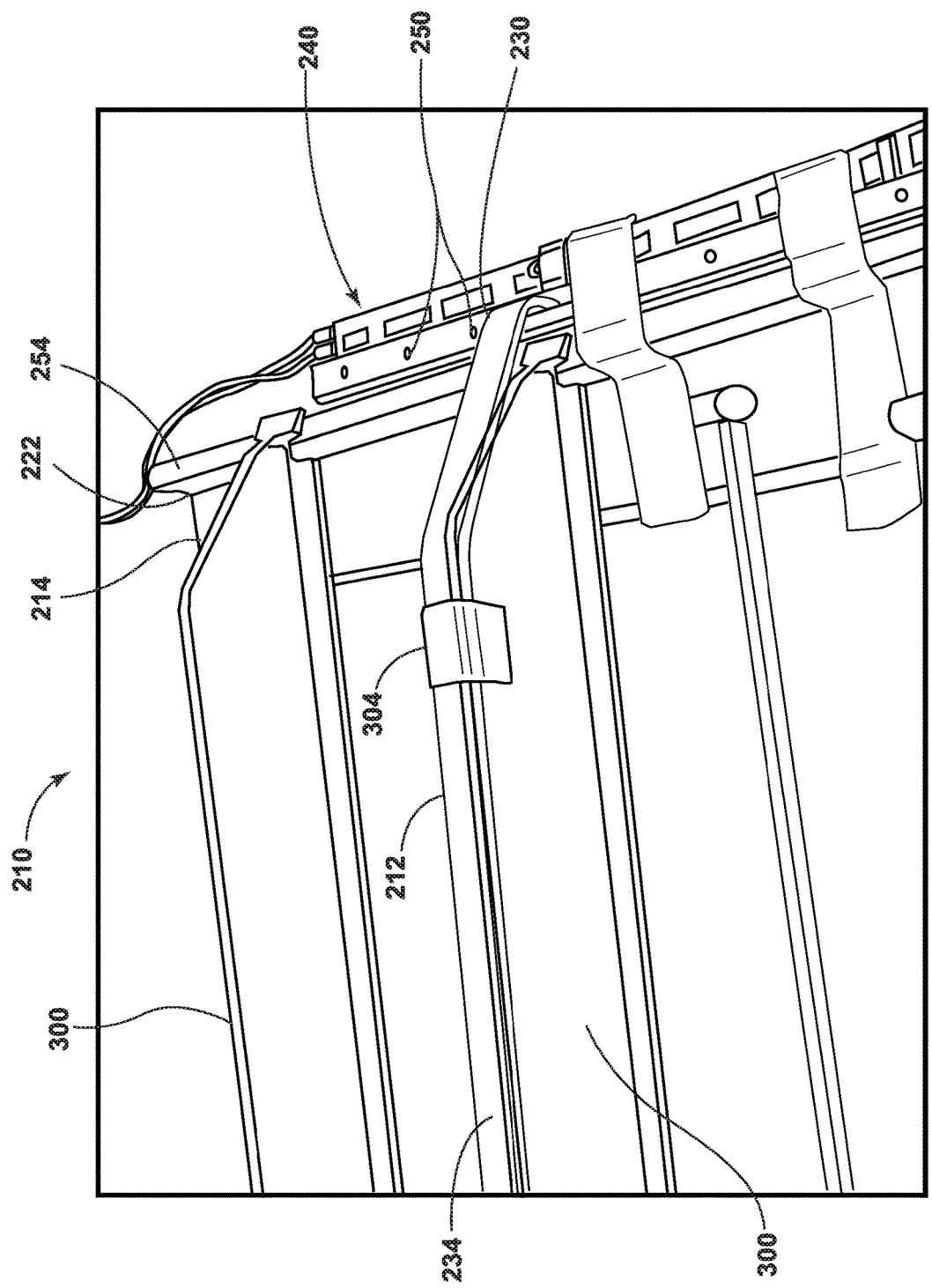
FIG. 7 is a schematic view of a light pipe and light supply according to a seventh embodiment of the invention.
Figure 8:
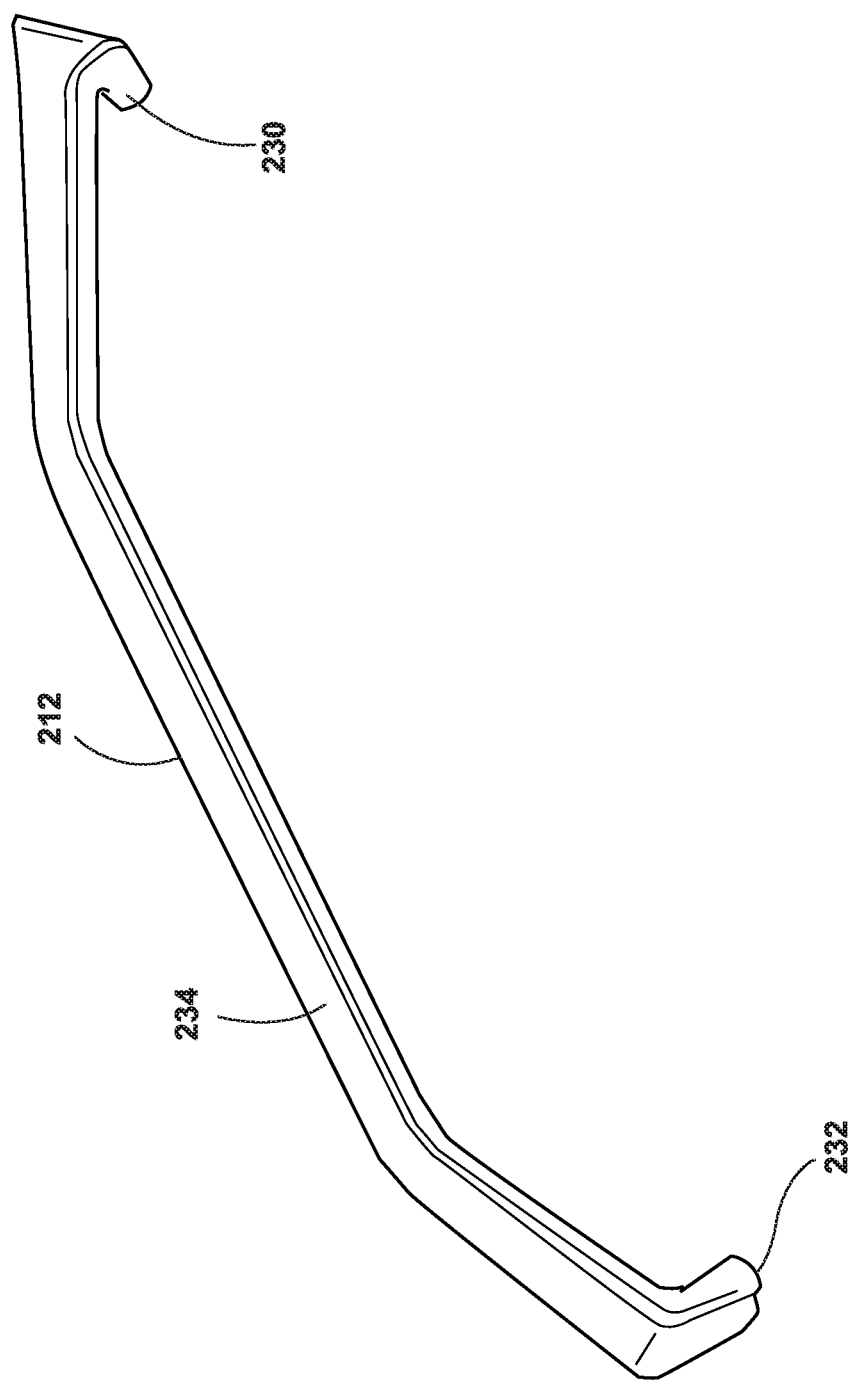
FIG. 8 is a perspective view of the light pipe of FIG. 7

FIGS. 7-8 illustrate an illumination assembly 210 that is similar to the illumination assembly 10 of FIG. 5. Therefore, elements of the illumination assembly 210 similar to those of the illumination assembly 10 are labeled with the prefix 200. Rather than each light pipe 212 receiving light from a light supply 40 that is in the form of a light pipe, in the illumination assembly 210, the light supply 240 can include one or more light engines including a row or strip of a plurality of light sources 250 provided adjacent the shelf rear edge 222. Each light pipe 212 can receive light from one or more of the light sources 250. For example, a strip of light sources 250 can include small fluorescent lamp bulbs, electroluminescent lighting (EL), organic light emitting diodes (OLEDs), and/or other non-LED light sources.

While the illumination assembly 210 is described in the context of a single light pipe 212, it will be understood that the illumination assembly 210 can include more than one light pipe, similar to the illumination assemblies 10, 110 described above. In addition, while the illumination assembly 210 is described in the context of a configuration which includes the support track 254 for supporting the light pipe 212, alternative or additional fastening or mounting systems for supporting the light pipe 212 can also be used, non-limiting examples of which include grooves within the shelf 214 that receive the light pipe 212 and frame elements at the shelf front and/or rear edge 220, 222.

Still referring to FIGS. 7 and 8, in the illumination assembly 210, rather than having the light pipe form the divider, the light pipe 212 is provided as a separate component that can be mounted to a shelf divider 300 configured to divide or partition the shelf 214. The light pipe 212 can be configured to sit atop the shelf divider 300 with the first end portion 230 configured to extend beyond the shelf rear edge 222 to engage the light supply 240. The first end portion 230 can include a light inlet configured to receive light emitted from at least one of the light sources 250 and distribute the light through the body portion 234 to the second end portion 232 to provide light to the shelf front edge and optionally along the depth dimension of the shelf 214 in a manner similar to that described above for the illumination assemblies 10, 110. The first end portion 230 can include one or more optical aberrations and/or have a shape configured to receive the light emitted from the one or more light sources 250. The spacing of the light sources 250 and the size of the first end portion 230 can be configured such that the first end portion 230 overlaps with and receives light from a single light source 250 or overlaps with multiple light sources 250.

As illustrated in FIGS. 7 and 8, the light pipe 212 can have a shape and size that generally corresponds to the shelf divider 300 to which the light pipe 212 is to be mounted. The light pipe 212 can be mounted to the shelf divider 300 using any known fastening or mounting system, non-limiting examples of which include adhesives, clamps, brackets, and tape. In one example, the light pipe 212 can include a groove in its undersurface designed to snap-fit with an upper edge of the shelf divider 300. In the example of FIG. 7, the light pipe 212 is secured to the shelf divider 300 using a piece of adhesive tape 304. In one example, the light pipe 212 can be used to retrofit an existing shelf unit that did not originally include illumination.

Figure 9:
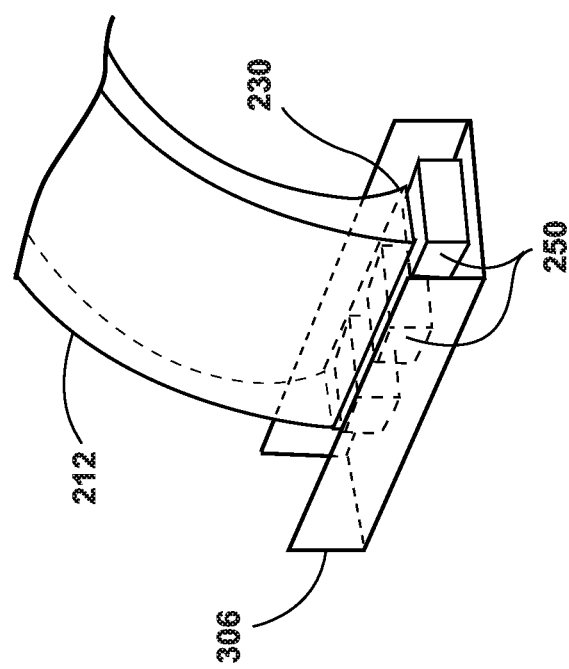
FIG. 9 is a schematic view of a light pipe and light supply according to an eighth embodiment of the invention.

As illustrated in FIG. 9, the strip of light sources 250 can optionally be housed within a housing 306 that at least partially encompasses the light sources 250. The first end portion 230 can be configured to fit within an opening in the housing 306 and couple with one or more light sources 250, by abutting or being positioned adjacent to the light source 250, in order to receive the light emitted by the light sources 250. The housing 306 can protect the light sources 250 and/or block/reflect stray light.

The color of light transmitted through the light pipe 212 can be selected based on the color of light output from the light source 250 or by providing one or more color filters between the inlet in the first end portion 230 and the light source 250. In another example, multiple rows of light sources 250, each outputting a different color light, can be provided in a manner similar to that described above for the light assembly 10 of FIG. 5 or 110 of FIG. 6. A light pipe 212 can be configured such that the first end portion 230 is capable of coupling with one of the multiple rows of light sources 250. The user can select the light pipe 212 having sufficient length to couple with the row of light sources 250 having the desired color to provide each divider with the desired color of illumination.

Figure 10:
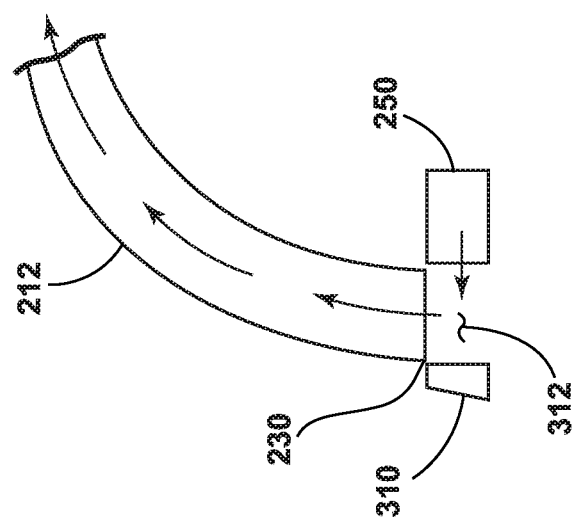
FIG. 10 is a schematic view of a light pipe and light supply according to a ninth embodiment of the invention.

In still another example, as illustrated in FIG. 10, the row of light sources 250 can be positioned at an angle with respect to the light inlet in the first end portion 230. Light emitted by the light sources 250 can be directed into a gap 312 with the light inlet of the first end portion 230 positioned above the gap 312. A reflective cap 310 can be provided to reflect light emitted by the light sources 250 back into the gap 312 for extraction by the first end portion 230. It will also be understood that a similar configuration can be used with the light supply light pipe 80 of FIG. 1 positioned at an angle with respect to the light inlet instead of the light sources 250.

It will be understood that the shelf divider 300 and light pipe 212 can be used with any of the illumination assemblies 10, 110 described above. Thus, rather than using a shelf divider in which the divider and the light pipe are integrally formed, the light pipe can be a separate component that is mountable to a pre-existing shelf divider. This can facilitate retrofitting existing shelf units with illumination and facilitate interchangeability between systems. For example, the shelf divider 300 and light pipe 212 can be used with the illumination assembly 10 in place of the light pipe 12. The first end portion 230 of the light pipe 212 can be configured to extract light from the light supply light pipe 80 in a manner similar to that described above for the first end portion 30 of the light pipe 12.

Figure 11:
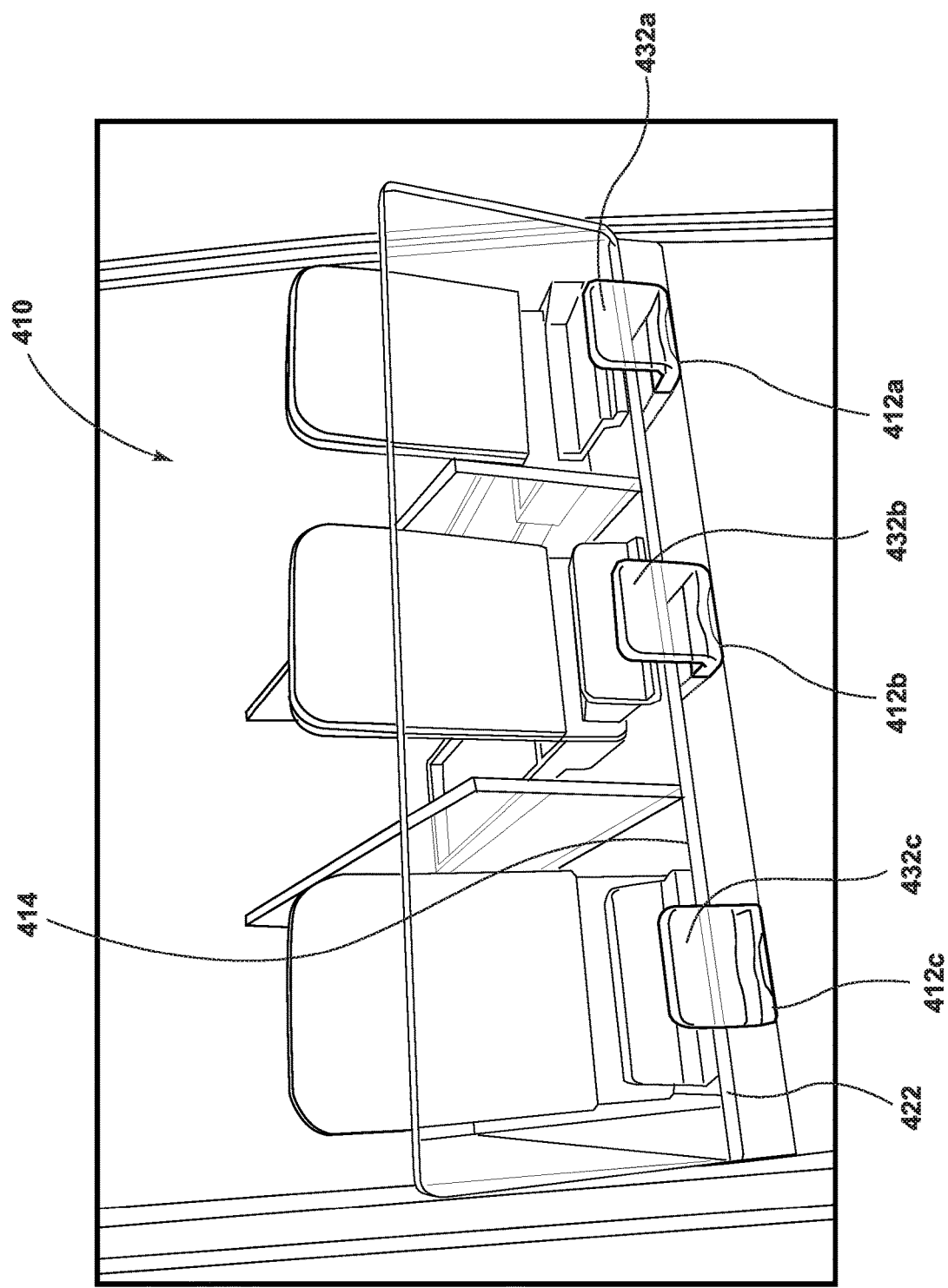
FIG. 11 is a perspective view of an illumination assembly according to a tenth embodiment of the invention

FIG. 11 illustrates an illumination assembly 410 that is similar to the illumination assembly 210 of FIG. 7 except for the manner in which the light pipes 412a-c are mounted. Therefore, elements of the illumination assembly 410 similar to those of the illumination assembly 210 are labeled with the prefix 400.

Rather than supporting each light pipe 412a-c on top of a shelf divider, the light pipes 412a-c can be mounted underneath the shelf 414. The first end portion of the light pipes 412a-c (not shown), can be configured according to any of the first end portions 30, 130, 230 above to receive light from a light engine 40, 140, 240 as described above. The light directed into the light pipes 412a-c can be transmitted to the light outlet in the second end portions 432a-c to illuminate the area adjacent the shelf front edge 422. The light pipes 412a-c can be mounted to the shelf 414 using any known fastening or mounting system, non-limiting examples of which include adhesives, welds, screws, pins, clamps, brackets, magnets, and a male-female interference-type connection.

Figure 12:
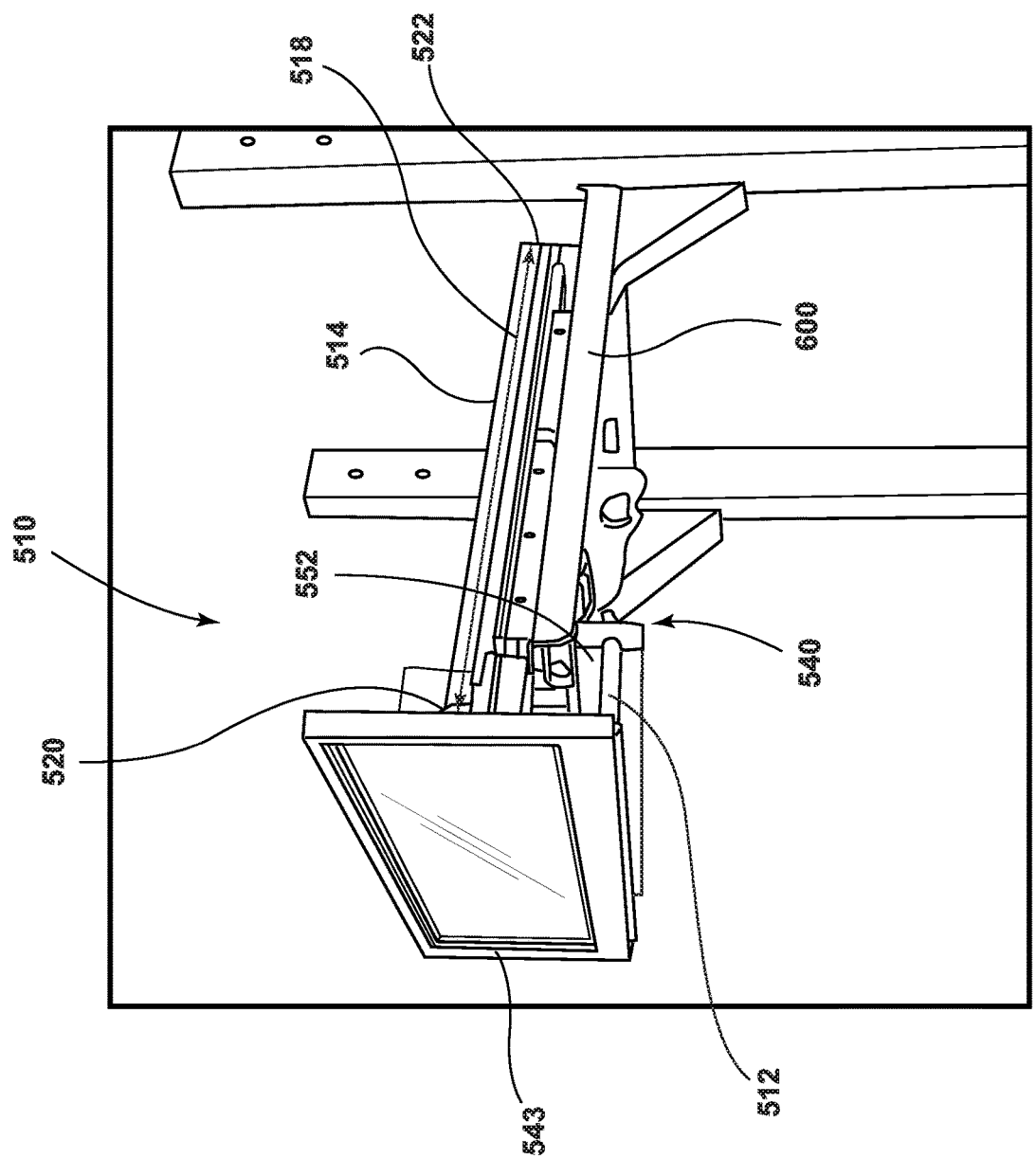
FIG. 12 is a perspective view of an illumination assembly according to an eleventh embodiment of the invention
Figure 13:
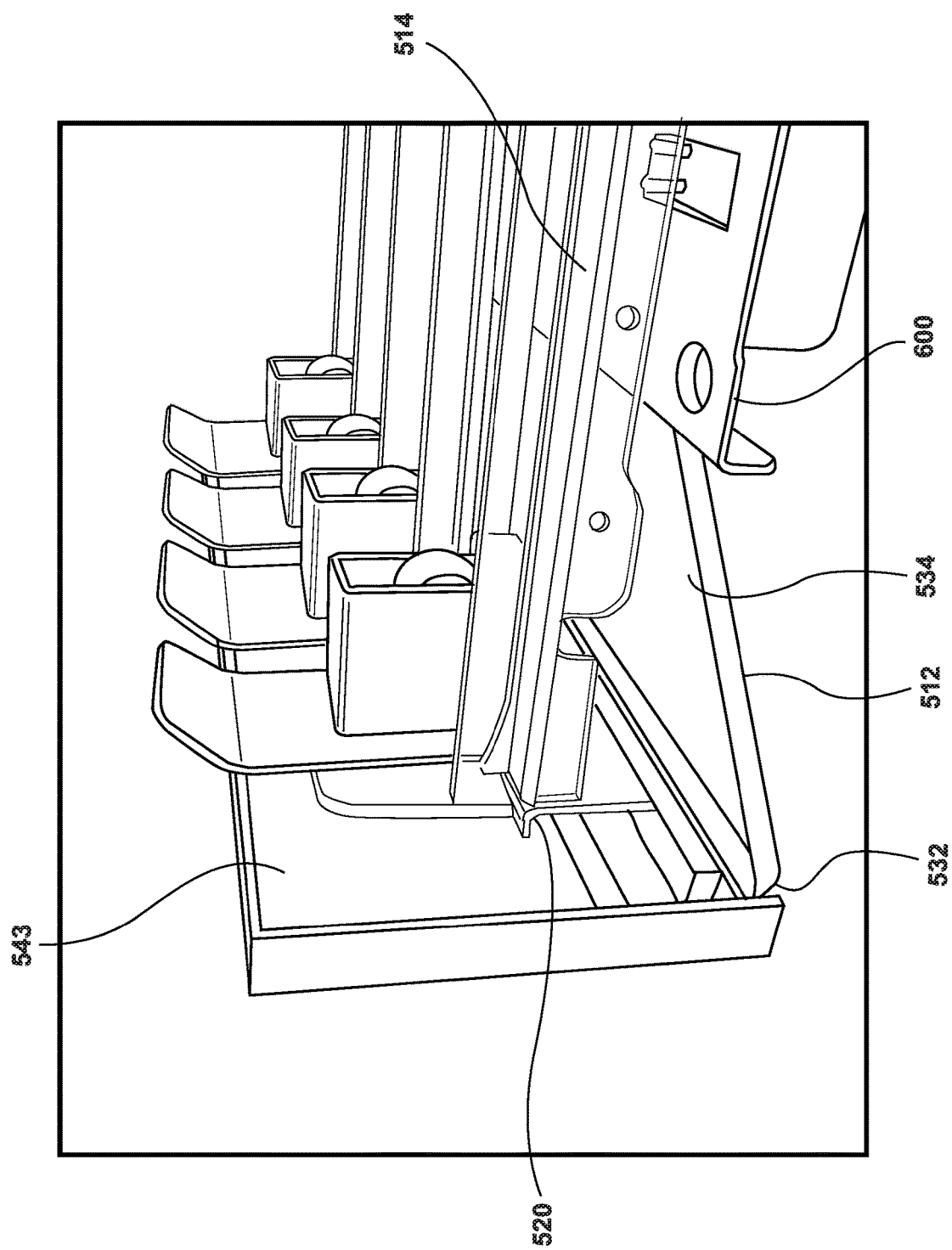
FIG. 13 is a rear perspective view of the illumination assembly of FIG. 12.

FIGS. 12-13 illustrate an illumination assembly 510 that is similar to the illumination assembly 210 of FIG. 7. Therefore, elements of the illumination assembly 510 similar to those of the illumination assembly 210 are labeled with the prefix 500.

The illumination assembly 510 is configured for use with a shelving unit that includes a tray 514 that is moveable in the depth dimension 518 with respect to a shelf frame 600 between a retracted position (FIG. 12) and an extended position (FIG. 13). The light engine 540 can be mounted to the shelf frame 600 while the light pipe 512 is mounted to the moveable tray 514. When the tray 514 is in the retracted position of FIG. 12, the light pipe 512 is coupled with the light engine 540 such that light from the light engine 540 is directed into the light inlet in the first end portion of the light pipe 512. The light pipe 512 can be configured to transmit the light through the body portion 534 of the light pipe 512 to the light outlet provided in the second end portion 532. The light emitted from the light outlet in the second end portion 532 can be utilized to illuminate the area adjacent the shelf front edge 520 and/or to backlight a sign.

For example, in the embodiment of FIGS. 12-13, the tray 514 includes a face plate 543 at the front edge 520. The light exiting the light outlet in the second end portion 532 can illuminate the area behind the face plate 543 to backlight a graphic in a sign supported by the face plate 543 or a graphic formed in or on the surface of the face plate 543. In one example, the face plate 543 can be in the form of a light pipe having a light inlet configured to receive light emitted by the light outlet in the second end portion 532. The face plate 543 light pipe can include one or more optical aberrations to distribute the light through the face plate 543 to provide area lighting and/or to provide backlighting to a graphic in a sign supported by the face plate 543 or a graphic formed in or on the surface of the face plate 543.

The light pipe 512 can be connected with the tray 514 or the face plate 543, which is connected with the tray 514, such that the light pipe 512 moves with the tray 514 when the tray 514 is moved into the extended position of FIG. 13. As the light pipe 512 is moved into the extended position, the light pipe 512 uncouples from the light supply 540. When the tray 514 is moved back into the retracted position of FIG. 12, the light pipe 512 is moved back into position with the light supply 540 such that light from the light engine is directed into the light inlet of the light pipe 512.

The light supply 540 can include a housing 552 having an opening through which the first end portion of the light pipe 512 can move as the tray 514 is moved between the extended and retracted positions. The housing 552 and/or the tray 514 can optionally include a track that helps guide the light pipe 512 to couple and uncouple with the light supply 540 during movement between the extended and retracted positions.

The light supply 540 can include a strip of light sources, such as described above with respect the illumination assembly 210 of FIG. 7, or a light supply light pipe 80, as described above with respect to the illumination assembly 10 of FIG. 1, for directing light into the light inlet of the light pipe 512 when the light pipe 512 is coupled with the light supply 540.

Figure 14:
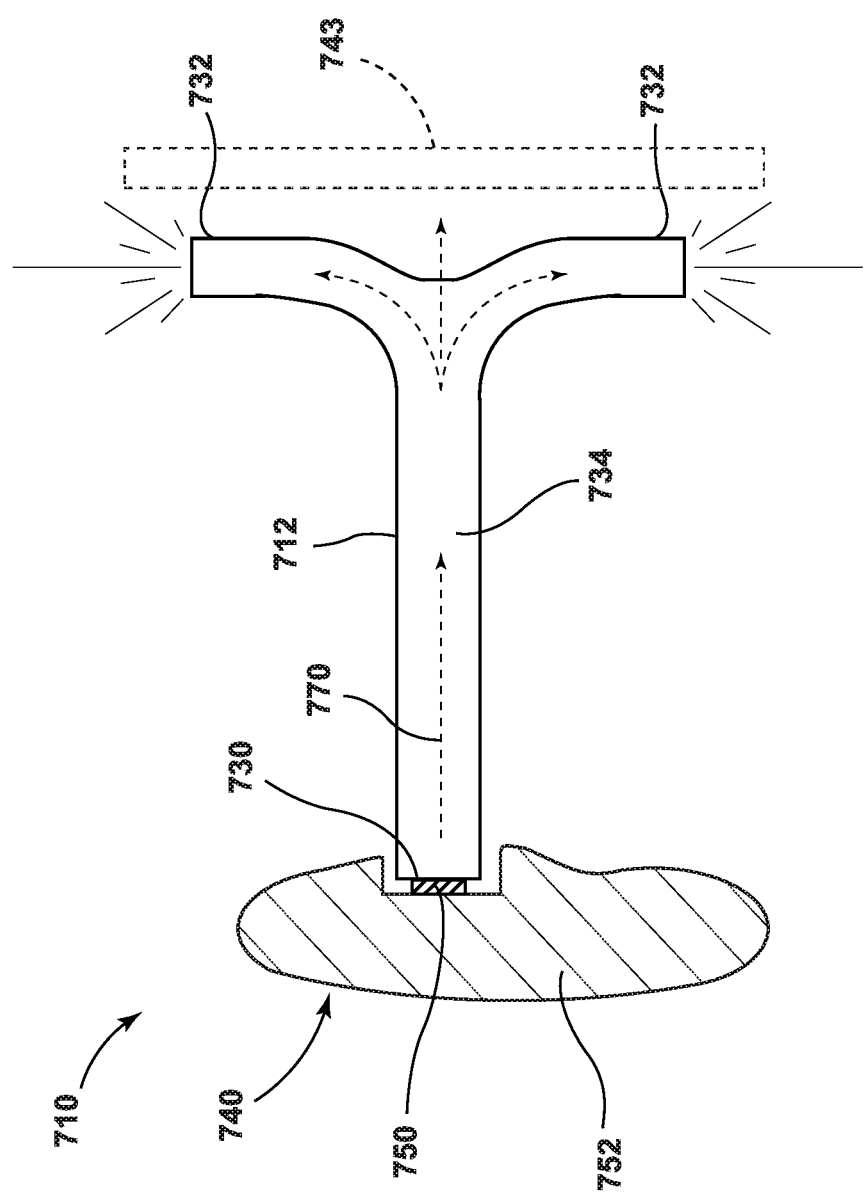
FIG. 14 is a schematic view of an illumination assembly according to a twelfth embodiment of the invention.

FIG. 14 illustrates an illumination assembly 710 that is similar to the illumination assembly 510 of FIG. 12. Therefore, elements of the illumination assembly 710 similar to those of the illumination assembly 510 are labeled with the prefix 700. The light pipe 712 can include shaped second end portion 732 configured to direct light toward a desired area adjacent the shelf front edge. In the example of FIG. 14, the second end portion 732 can have a T-shape such that light transmitted through the body portion 734 from the light source 750 is directed upward and downward to illuminate areas in multiple directions. The light pipe 712 can be used to illuminate items stored on the shelf above and below the light pipe 712 and/or to backlight a sign 743, for example.

Figure 15:
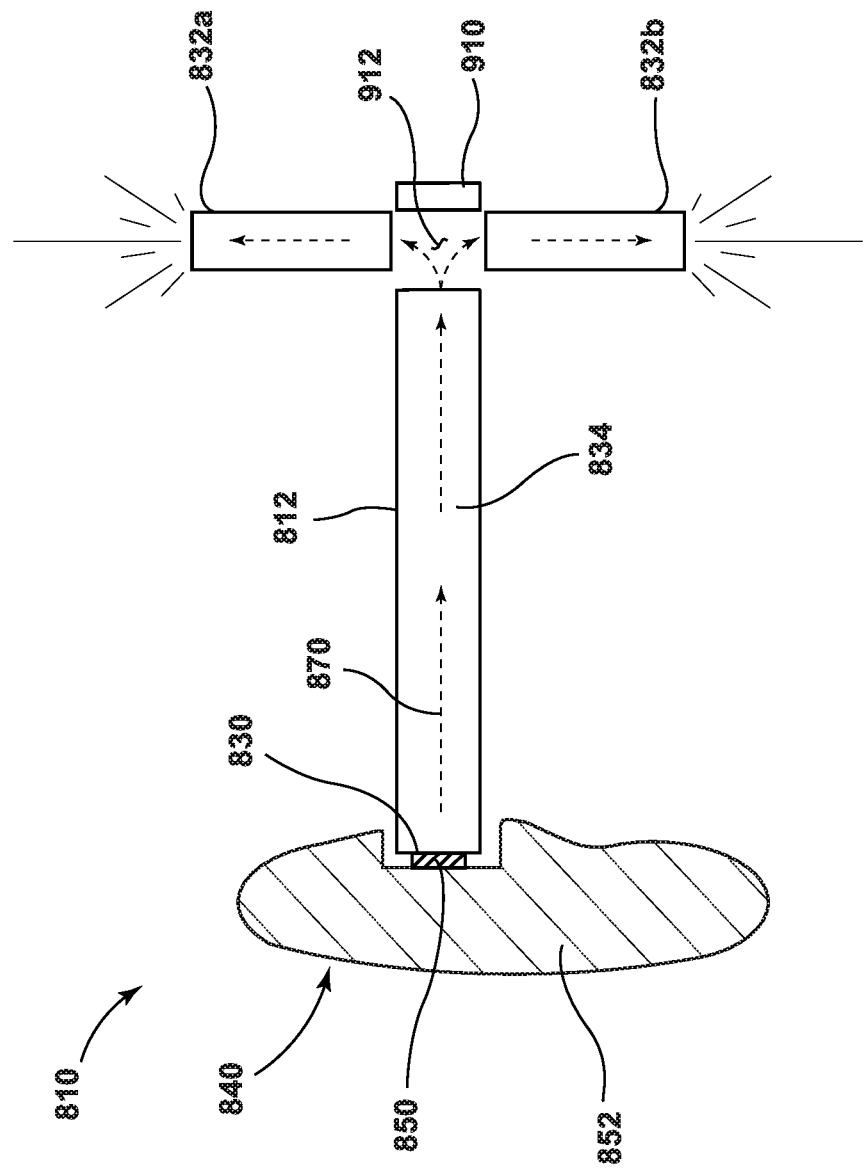
FIG. 15 is a schematic view of an illumination assembly according to a thirteenth embodiment of the invention.

In yet another example, illustrated in FIG. 15 in which elements similar to those of the illumination assembly 710 are labeled with the prefix 800, light traveling through the body portion 834 of the light pipe 812 can be emitted into a gap 912. Second end portions 832a, b can be arranged on either side of the gap 912 to extract the light emitted from the end of the body portion 834 into the gap 912. A reflective end cap 910 can be provided to reflect light back into the gap 912 for extraction by the second end portions 832a, b. This configuration can be used in a manner similar to the illumination assembly 710 to illuminate items stored on the shelf above and below the light pipe 812 and/or to backlight a sign positioned in front of the shelf.

Traditional lighting systems for pusher rack systems attach the light source to the moveable pusher tray, which results in repeated movement of the wires connecting the light source to a power source. The repeated movement of the pusher tray can result in the wires becoming damaged or broken, which can prevent the lighting system from functioning. The illumination assemblies 510, 710, 810 described herein utilize a light pipe that moves with the moveable pusher tray and couples and uncouples with a light supply on a stationary part of the system, eliminating the need for wires that move with the pusher tray.

III. Conclusion

The above description is that of current embodiments of the invention. Various alterations and changes can be made without departing from the spirit and broader aspects of the invention as defined in the appended claims, which are to be interpreted in accordance with the principles of patent law including the doctrine of equivalents. To the extent not already described, the different features and structures of the various embodiments of the illumination assemblies 10, 110, 210, 410, 510, 710, 810 may be used in combination with each other as desired. That one feature may not be illustrated in all of the embodiments is not meant to be construed that it cannot be, but is done for brevity of description. Thus, the various features of the different embodiments of the illumination assemblies 10, 110, 210, 410, 510, 710, 810 may be mixed and matched as desired to form new embodiments, whether or not the new embodiments are expressly disclosed.

This disclosure should not be interpreted as an exhaustive description of all embodiments of the invention or to limit the scope of the claims to the specific elements illustrated or described in connection with these embodiments. For example, and without limitation, any individual element of the described invention may be replaced by one or more alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative.

The invention is not limited to the details of operation or to the details of construction and the arrangement of the components set forth in the above description or illustrated in the drawings. The invention may be implemented in various other embodiments and practiced or carried out in alternative ways not expressly disclosed herein.

The phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

The disclosed embodiment includes a plurality of features that are described in concert and that might cooperatively provide a collection of benefits. The present invention is not limited to only those embodiments that include all of these features or that provide all of the stated benefits.

Any reference to claim elements in the singular, for example, using the articles "a," "an," "the" or "said," is not to be construed as limiting the element to the singular.

Directional terms, such as "front," "back," "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation.

The embodiments of the invention in which an exclusive property or privilege is claimed are defined as follows:

1. An illumination assembly for use with a shelving unit having a depth dimension defined between a front edge and a rear edge of the shelving unit, the shelving unit including a tray that is moveable in the depth dimension between a retracted position and an extended position, the illumination assembly comprising:

a light pipe including a first end portion including a light inlet, a second end portion opposite the first end portion, a body extending between the first and second end portions, and at least one light outlet in one of the second end portion and the body;

a light engine adapted to selectively couple with the first end portion to direct light into the light inlet, whereby at least a portion of the light subsequently exits the light pipe through the at least one light outlet; and a sign including a graphic connected with the tray;

the light pipe adapted to connect with the tray and the light engine adapted to connect with a stationary portion of the shelving unit such that (a) when the tray is in the retracted position, the first end portion of the light pipe is coupled with the light engine to receive light through the light inlet, wherein the light exits through the light outlet and backlights the graphic, and (b) when the tray is in the extended position, the light pipe is uncoupled from the light engine.

2. The illumination assembly of claim 1 wherein the light exiting the at least one light outlet provides illumination of the area adjacent the shelf.

3. The illumination assembly of claim 1, further comprising a housing encompassing the light engine and wherein the housing includes an opening configured to receive the first end portion therein.

4. The illumination assembly of claim 1 wherein the second end comprises a first portion extending in a first direction at a first angle relative to the body and having a first light outlet and a second portion extending a second direction, different than the first direction, at a second angle relative to the body and having a second light outlet.

5. The illumination assembly of claim 4 wherein the first light outlet illuminates an area above the front edge of the shelving unit and the second light outlet illuminates an area below the front edge of the shelving unit.

\* \* \* \* \*